US006775113B2

(12) United States Patent
Tamai et al.

(10) Patent No.: US 6,775,113 B2
(45) Date of Patent: Aug. 10, 2004

(54) SAFETY DEVICE FOR POWER CIRCUIT AND FUSE BOX

(75) Inventors: Yasuhiro Tamai, Shizuoka (JP); Tetsuya Hasegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/242,468

(22) Filed: Sep. 13, 2002

(65) Prior Publication Data

US 2003/0058598 A1 Mar. 27, 2003

(30) Foreign Application Priority Data

Sep. 21, 2001 (JP) ..................................... P2001-289523

(51) Int. Cl.[7] .................................................. H02H 5/04
(52) U.S. Cl. ........................................... 361/20; 361/23
(58) Field of Search .............................. 361/20, 23, 24, 361/25, 103, 104; 307/10.1, 11, 28, 48

(56) References Cited

U.S. PATENT DOCUMENTS 4,626,952 A 12/1986 Morikawa .................... 361/55
5,731,944 A * 3/1998 Yasukuni et al. ........... 361/104
6,243,245 B1 * 6/2001 Totsuka et al. ............. 361/103
6,340,848 B1 * 1/2002 Maeda ....................... 307/10.1
6,351,361 B1 * 2/2002 Kawazu et al. ............. 361/103
6,384,489 B1 * 5/2002 Bluemel et al. ........... 307/10.1
6,400,589 B2 * 6/2002 Abo et al. ..................... 363/65
6,455,951 B1 * 9/2002 Shultz et al. ............. 307/10.1
6,459,170 B1 * 10/2002 Tamai et al. .................. 307/48
6,490,142 B1 * 12/2002 Smith .......................... 361/104
6,583,977 B1 * 6/2003 Oglesbee .................... 361/104

FOREIGN PATENT DOCUMENTS

GB 2 174 854 A 11/1986

* cited by examiner

*Primary Examiner*—Brian Sircus
*Assistant Examiner*—Danny Nguyen
(74) *Attorney, Agent, or Firm*—Finnegan, Henderson, Farabow, Garrett & Dunner, L.L.P.

(57) ABSTRACT

The safety device for a power circuit includes a first power circuit (2A) including a first load (4) and a first fuse element (5A) for receiving a first voltage power from a power supply (9) to supply the first voltage power to the first load through the first fuse element. The safety device includes a second power circuit (2B) including a second load (3) and a second fuse element (5B) for receiving a second voltage power from a converter (8), which converts the first voltage power into the second voltage power, to supply the second voltage power to the second load (3) through the second fuse element (5B). The device includes a fusion system (20) for fusing the other of the first and second fuse elements when an arbitrary one of the first and second fuse elements fuses.

14 Claims, 8 Drawing Sheets

SAFETY DEVICE FOR POWER CIRCUIT AND FUSE BOX

BACKGROUND OF THE INVENTION

1. Field of the Invention

The invention relates to a safety device for a power circuit and a fuse box effectively adapted for the safety device. The power circuit supplies power to loads on two related systems. The loads include, for example, an actuator and an electrical control unit (referred to as ECU) for controlling the actuator.

2. Description of Relevant Art

A conventional energization system for a 14 V-system automotive includes a junction box. The box includes a branched power circuit. The system includes ECUs. The system includes loads for producing physical output, such as an actuator. The power circuit supplies a current to the ECUs and actuators through common fuses. The system allows a voltage from a power supply to be directly inputted to the ECUs. Respective ECUs include corresponding series regulator inside them, which converts to a low-voltage of, for example, 5V for actuating an internal circuit.

With recent advances in development, an automotive is equipped with a motor generator with efficient fuel cost, and can drive at a high-voltage of 42 V. Voltage conversion of a high-voltage of 42 V, using a series regulator, causes excessive loss. A proposal is that all ECUs house more efficient switching converters. The proposal, however, would result in remarkably high prices.

Another proposal is that a junction box includes a DC/DC converter within it. The converter collectively converts the voltage of a 42 V power supply into a lower voltage of 12 V to be distributed to respective ECUs. One system includes a power circuit for a high-voltage, which applies a voltage of 42 V to an actuator. Another system includes a power circuit for low-voltage, which applies a voltage of 12 V to an ECU. Respective power circuits have corresponding fuses for high and low voltage in them to protect the circuits.

As the ECU controls the actuator, the two systems are closely related to each other. If an abnormality occurs on one system when a current is being supplied to loads on the two systems, the supply of current to the other system is necessarily stopped.

In the 14 V system, a current is supplied to both of the actuator and ECU through fuses. For example, in response to an abnormality in the actuator, fusion of a fuse automatically stops the supply of a current to an ECU. In response to an abnormality in the ECU, fusion of a fuse automatically stops the supply of current to the actuator. These produce no specific problems.

Another proposal is that energization system is separated into systems for the actuator and the ECU respectively. A current is supplied to each of the actuator and the ECU through corresponding fuses for high and low voltage. The fusion of one fuse in the system due to an abnormality allows the other fuse to be left effectively, and to continuously supply a current to the other load.

When a fuse fuses if an abnormality exists on, for example, the actuator, the supply of a current to the ECU for controlling it should stop. After the fusion of one fuse, a voltage is continuously applied to the remaining load. The application can cause an abnormality on the remaining system, such as a rapid short-circuit or a rare-short. Systems separated from a power circuit produce new problems.

SUMMARY OF THE INVENTION

The invention is directed to a safety device for a power circuit, and a fuse box effectively adapted for the safety device. Where a current is applied to two related loads of two systems, the fusion of the fuse on one system caused by the fusion of the fuse on other system ensures the safety of entire circuit.

A first aspect of the invention is directed to a safety device for a power circuit. The device includes a first power circuit including a first load and a first fuse element for receiving a first voltage power from a power supply to supply the first voltage power to the first load through the first fuse element. The device includes a second power circuit including a second load and a second fuse element for receiving a second voltage power from a converter, which converts the first voltage power into the second voltage power, to supply the second voltage power to the second load through the second fuse element. The device includes a fusion system for fusing the other of the first and second fuse elements when an arbitrary one of the first and second fuse elements fuses.

Preferably, the fusion system includes a circuit for applying overcurrent to the other fuse element to be fused when said arbitrary fuse element fuses.

Preferably, the fusion system includes a heating element for heating the other fuse element to be fused at a fusion temperature when said arbitrary fuse element fuses.

Preferably, the first power circuit includes a first power terminal connected to the power supply. The first power circuit includes a second load terminal connected to the first load. The second power circuit includes a second power terminal connected to the power supply. The second power circuit includes a second load terminal connected to the second load. The first fuse element includes a first fusible member extending from the first power terminal. The second fuse element includes a second fusible member extending from the second power terminal. The fusion system includes a first conductive member extending from the first load terminal, and conductively contacting with the first fusible member. The fusion system includes a second conductive member extending from the second load terminal, and conductively contacting with the second fusible member. The fusion system includes a displacing system for displacing a corresponding conductive member to contact with the other fusible member, the other conductive member or the other load terminal, when said arbitrary fusible member fuses.

Preferably, the second load includes a controller for controlling the first load.

Preferably, the second power circuit supplies a current to the controller, serving as a power circuit for low-voltage. The first power circuit supplies a current to the first load, serving as a power circuit for high-voltage.

Preferably, the first fuse element includes a first fusible member arranged side by side with a first circuit member of the first power circuit. The second fuse element includes a second fusible member arranged side with by side a second circuit member of the second power circuit. The fusion system includes a first conductive member having a tendency to deform to contact with the second circuit member. The first conductive member is separated away from the second circuit member, and is retained against the first fusible member. The fusion system includes a second conductive member having a tendency to deform to contact with the first circuit member. The second conductive member is separated away from the first circuit member, and is retained against the second fusible member.

Preferably, the fusion system includes a first shunt circuit between the first fuse element and the first load for grounding the first power circuit. The fusion system includes a control circuit responsive to identical electric potentials of both terminals of the second fuse element to open the first shunt circuit.

Preferably, the control circuit is responsive to an electric potential difference between both terminals of the second fuse element to close the first shunt circuit.

Preferably, the fusion system includes a second shunt circuit between the second fuse element and the second load for grounding the second power circuit. The fusion system includes a control circuit responsive to identical electric potentials of both terminals of the first fuse element to open the second shunt circuit.

Preferably, the control circuit is responsive to an electric potential difference between both terminals of the second fuse element to close the first shunt circuit.

A second aspect of the invention is directed to a fuse box adapted for power circuits. The fuse box includes a first power terminal configured to connect a power supply via a first power circuit. The fuse box includes a first load terminal configured to connect a load of the first power circuit. The fuse box includes a second power terminal configured to connect the power supply via a second power circuit. The fuse box includes a second load terminal configured to connect a load of the second power circuit. The fuse box includes a first fusible member extending from the first power terminal. The fuse box includes a second fusible member extending from the second power terminal. The fuse box includes a first conductive element extending from the second load terminal, and conductively contacting with the first fusible member. The fuse box includes a second conductive member extending from the second load terminal, and conductively contacting with the second fusible member. The fuse box includes a displacing system for displacing a corresponding one of the first and second conductive members to contact with the other fusible member, the other conductive member or the other load terminal, when an arbitrary one of the first and second fusible members fuses.

Preferably, said corresponding conductive member has resilience.

Preferably, the displacing system includes a resilient member biasing said corresponding conductive member against said arbitrary fusible member.

According to the safety device, when one of the first and second fuse elements fuses, the other fuse element is forced to fuse, thus stopping current to the other load. Thus, if an abnormality occurs on one of the first and second loads in association with each other, continuous supply of a current to the other load would produce inconvenience. The device securely prevents this inconvenience and ensures safety.

For example, one of two loads is an actuator and the other load is a control unit for controlling the actuator. If an abnormality on the actuator causes a fuse to be fused, this device prevents continuous application of current to the control unit. Similarly, if an abnormality on the controller causes the other fuse to be fused, the device prevents continuous application of current to the actuator.

For example, a combination of logical circuit ensures the safety of the power circuits.

For example, a combination of the heating element and the circuit for energizing the heating element ensures the safety of the power circuits.

According to the device, an abnormality on the first load causes the application of overcurrent to the first power circuit to fuse the first fusible member. The fusion disengages the retention of the first fuse element in a normal position. The first conductive member is displaced toward the second fusible member, the second conductive member, and the second load terminal for conductive contact.

Thus, the second fusible member is joined with the first load, as well as with the second load. The joint allows the instant application of overcurrent more than normal to the second fusible member. The overcurrent fuses the second conductive member, which simultaneously stops the energization of both loads, thus ensuring safety.

If an abnormality occurs on the second load, the fusion of the second conductive member allows the fusion of the first conductive member in a reversed motion. Similarly, this simultaneously stops the energization of both loads, thus ensuring safety.

If the controller has an abnormality when the second fuse element for energizing the controller fuses, the energization of the first load to be controlled by the controller stops. On the other hand, if the first load has an abnormality when the first fuse element for energizing the first load fuses, the energization of the controller stops. This ensures safety of the entire energization system.

If one of the first and second fuse elements of the first and second power circuits fuses due to an abnormality, the other fuse element is securely fused. The fusion prevents an unforeseen situation, such as the generation of overcurrent or a rare short-circuit.

According to the fuse box, when the application of overcurrent to the first power circuit allows the fusion of the first fusible member, the fusion disengages the retention of the first conductive member at a normal position. The first conductive member is displaced toward the second fusible member, the second conductive member or the second load terminal for conductive contact. Thus, overcurrent more than normal is instantly applied to the second fusible member. The overcurrent fuses the second conductive member, stopping the energization of the load, and thus ensuring safety. When the application of overcurrent to the second power circuit allows the fusion of the second fusible member, in a reversed motion, the fusion of the first fusible member stops the energization of the load, ensuring safety.

One of the first and second fusible members is fused, and the corresponding conductive member in conductively contact with said one fuse element conductively contact with the other fuse element by its own resilience. Thus, compared to using another spring separated from a conductive member, this reduces the number of components and simplifies the structure.

BRIEF DESCRIPTION OF THE ACCOMPANYING DRAWINGS

Figure 5A:
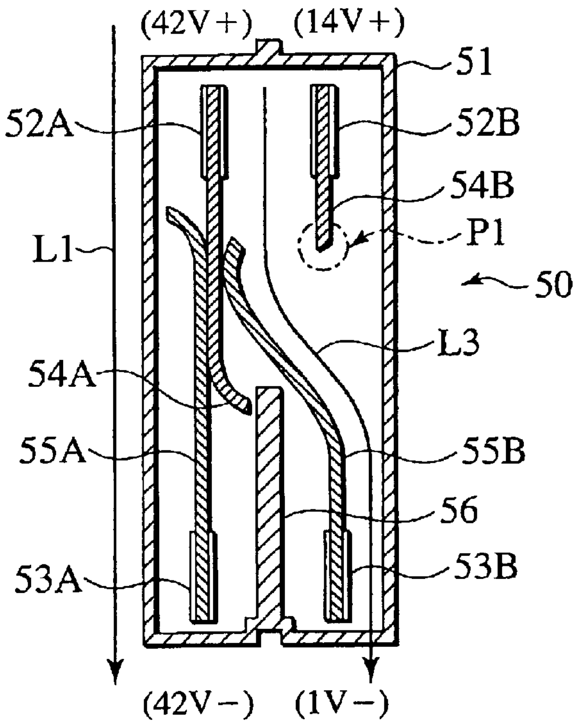
Figure 5B:
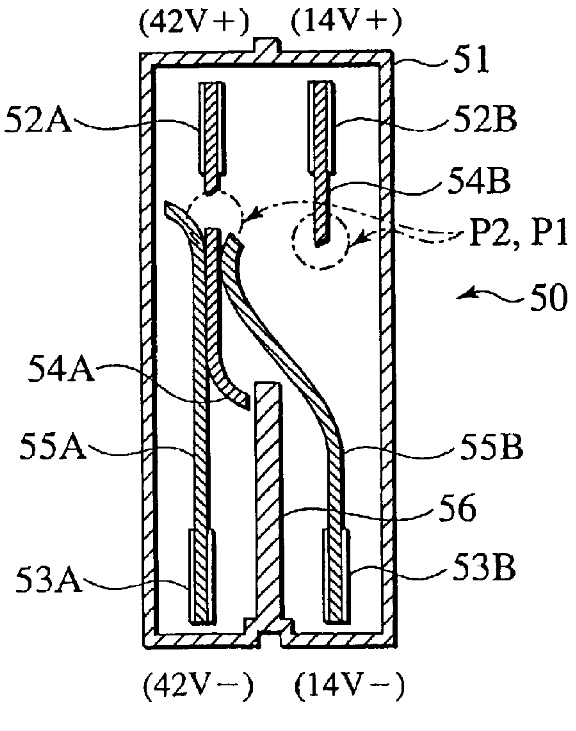
Figure 6A:
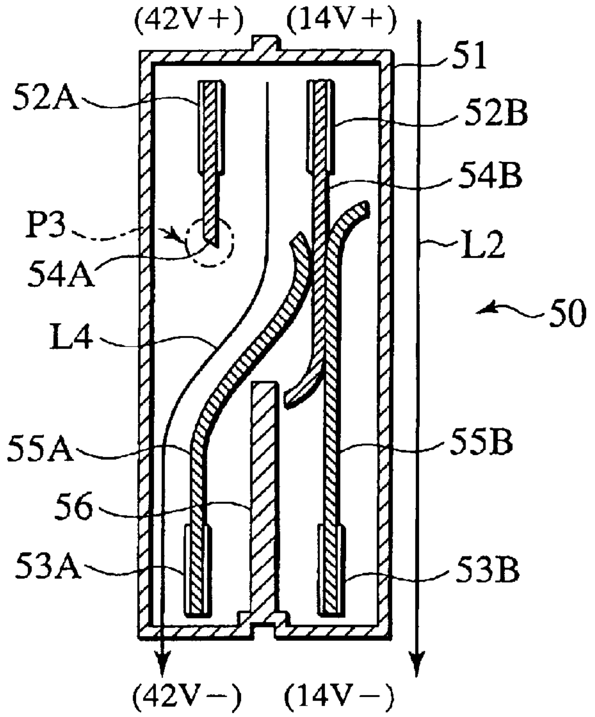
Figure 6B:
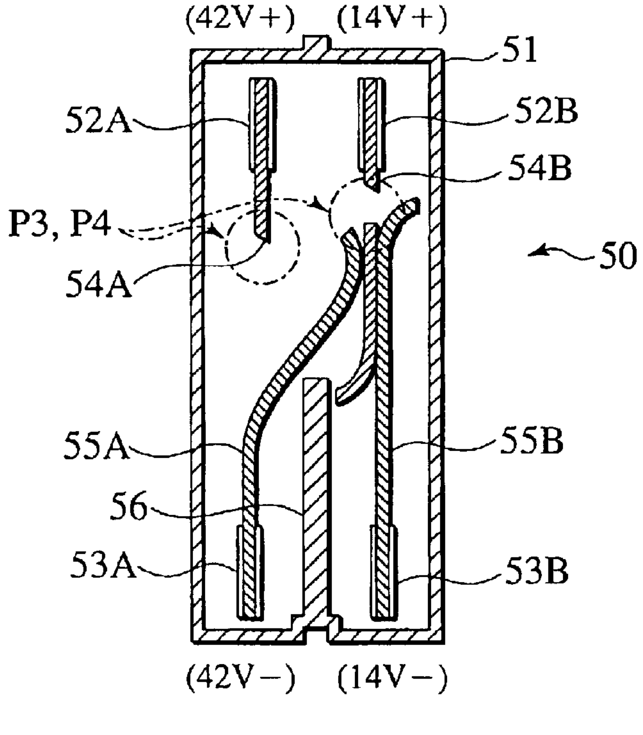
Figure 7:
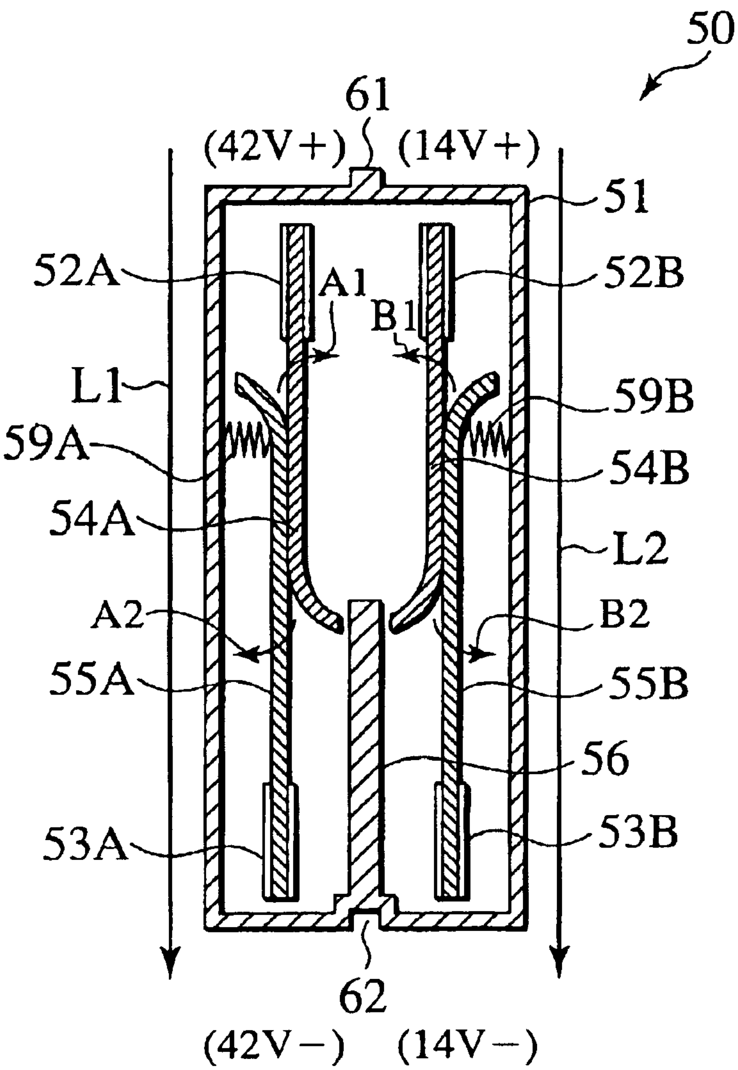
Figure 8:
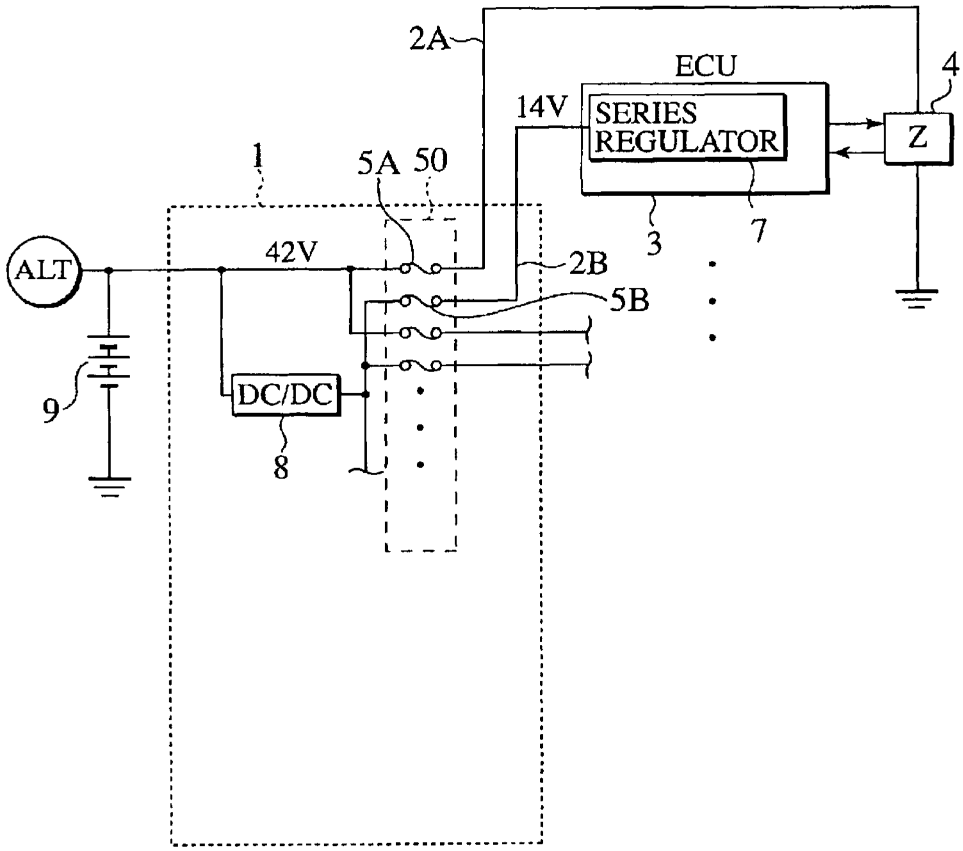

FIGS. 5A and 5B are illustrative views of the behavior when a 14 V fusible conductive member (corresponding to a fuse) is fused first; FIG. 5A illustrates a step of fusing a 14V fusible electrical conductive member; FIG. 5B illustrates a step of fusing a 42 V fusible electrical conductive member due to the displacement of the 14 V fusible conductive member successively after the fusion of the 14 V fusible conductive member;

FIGS. 6A and 6B are illustrative views of the behavior when a 42 V fusible conductive member (corresponding to a fuse) is fused first; FIG. 6A illustrates a step of fusing a 42V fusible conductive member; FIG. 6B illustrates a step of fusing a 14 V fusible electrical conductive member due to the displacement of the 42 V fusible conductive member successively after the fusion of the 42 V fusible conductive member;

FIG. 7 is a sectional view of the fuse box according to another embodiment; and FIG. 8 is a circuit diagram, which includes systems of 42 V and 12 V separated each other according to the third embodiment.

DETAILED DESCRIPTION OF THE PREFERRED EMBODIMENTS

The embodiments of the invention will hereby be described with reference to the drawings.

First Embodiment

The energization system includes 42 V power supply 9. The system includes a logic circuit (forced-fusion circuit) 20 for forced-fusion. Power supply 9 supplies a voltage of 42 V to a junction box 1. Box 1 supplies a voltage of 42 V to actuator 4, and a voltage of 12 V to ECU 3, respectively. Actuator 4 produces a physical output.

Figure 1:
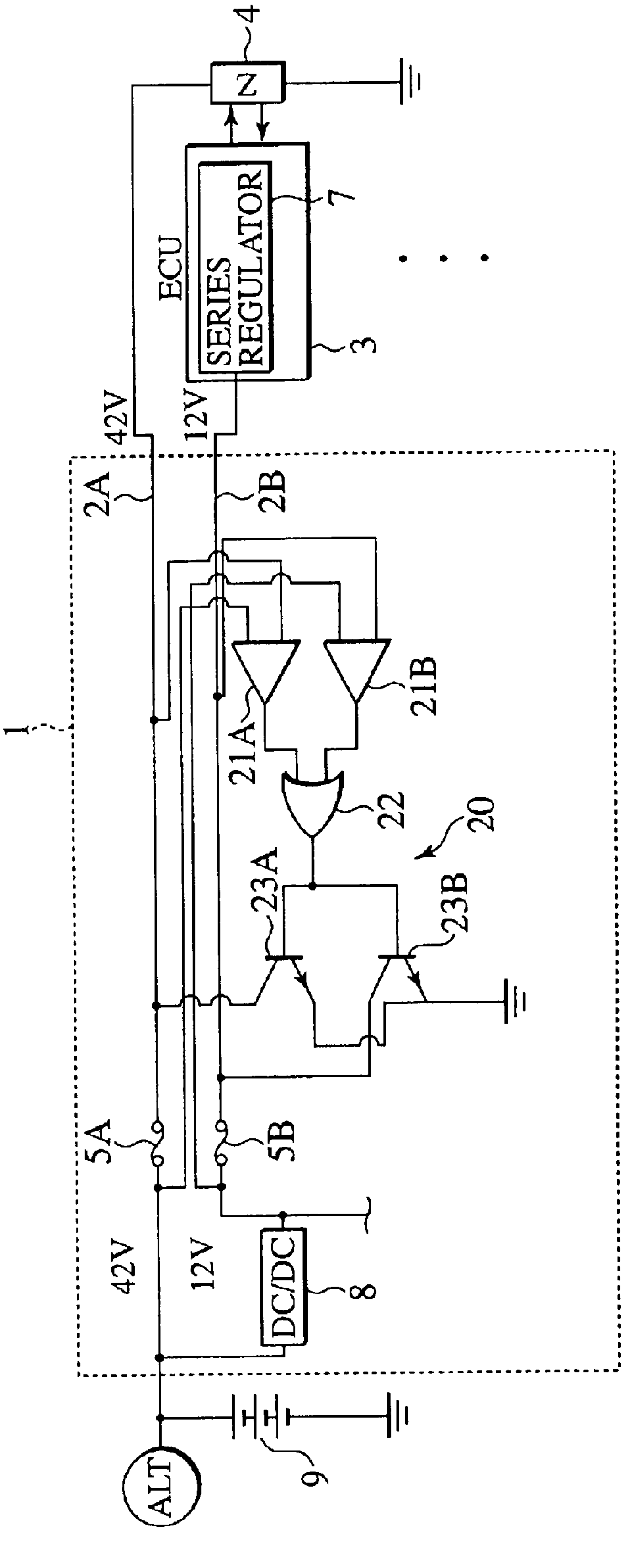
FIG. 1 is a circuit diagram illustrating an energization system in an entire constitution, which includes the safety device according to the first embodiment.

Relative to the system in FIG. 1, box 1 includes high-voltage power circuit 2A (second power circuit), which applies a voltage of 42V to actuator (second load) 4. Box 1 includes low-voltage power circuit 2B, which applies a voltage of 12 V to ECU (first load) 3 for the control of actuator 4. Box 1 includes fuse 5A (second fuse) for high-voltage on circuit 2A. Box 1 includes fuse (first fuse) 5B for low-voltage on circuit 2B. Box 1 includes DC/DC converter 8, which collectively converts a high voltage of 42 V into a low voltage of 12 V to be supplied to circuit 2B. Box 1 houses converter 8, fuses 5A, 5B, and circuit 20.

Logical circuit 20 includes two parallel comparators 21A, 21B. Circuit 20 includes OR circuit 22, with the respective input terminals connected to corresponding comparators 21A, 21B. Circuit 20 includes two transistors 23A, 23B, with the respective input terminals connected in parallel to the output terminal of OR circuit 20. When one fuse 5A (or 5B) is fused, overcurrent is forced to flow through the other fuse 5B (or 5A). The overcurrent fuses the other fuse 5B (or 5A).

Each of comparators 21A, 21B monitors the voltage between the both terminals of each of high and low-voltage fuses 5A, 5B. Normally, without the fusion of fuse 5A or 5B, little potential difference between the both terminals of fuse 5A or 5B occurs. If the fusion of one fuse 5A (or 5B) produces potential difference for some reason, comparator 21A (or 21B) has inverted output to be outputted as a High signal. The fusion of one fuse 5A (or 5B) allows OR circuit 22 to actuate transistor 23A (or 23B). The non-fused fuse 5B (or 5A) has the terminal connected to the load, which is short circuited to the ground. The short circuit allows overcurrent to flow through fuse 5B (or 5A). The over current forces the other fuse 5B (or 5A) to be fused.

The operation of the system is described.

Comparator 21B detects the voltage between both terminals of fuse 5B through which ECU 3 is energized. For example, an abnormality in the system of ECU 3 causes fuse 5B to be fused. The potential difference between both terminals of fuse 5B allows comparator 21B to output a High signal. The signal allows OR circuit 22 to output a drive signal to transistors 23A and 23B. Transistor 23A short circuits the other fuse 5A to the ground, with the terminal connected to the load. The short-circuit allows overcurrent to flow through fuse 5A, which forces it (5A) to be fused. The fusion stops the energization of actuator 4.

On the other hand, comparator 21A detects the voltage between both terminals of fuse 5A through which actuator 4 is energized. For example, an abnormality in the system of actuator 4 causes fuse 5A to be fused. The potential difference between both terminals of fuse 5A allows comparator 21A to output a High signal. The signal allows OR circuit 22 to output a drive signal to transistors 23A and 23B. Transistor 23B short circuits the other fuse 5B to ground, with the terminal connected to the load, to the ground. The short-circuit allows overcurrent to flow through fuse 5B, which forces it (5B) to be fused. The fusion stops the energization of ECU 3.

When one of fuses 5A, 5B for high and low-voltages is fused, the other one is forced to fuse. The fusion prevents an unforeseen situation, such as the abnormal running of actuator 4, additional production of an overcurrent, or a rare short, thus ensuring a safe entire system. In particular, the supplement of logical circuit 20 ensures safety and simplifies the constitution.

Second Embodiment

Figure 2:
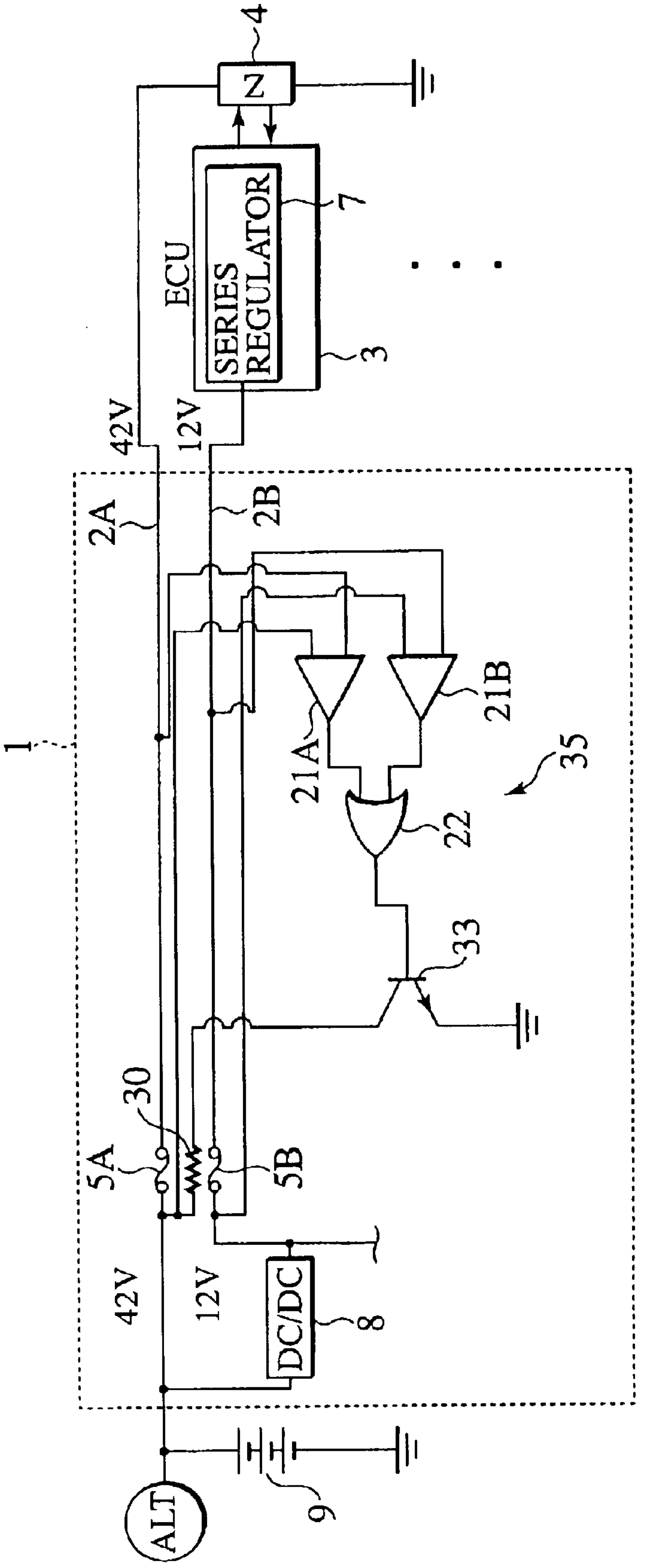
FIG. 2 is a circuit diagram illustrating an energization system in an entire constitution, which includes the safety device according to the second embodiment.

A modification is added to a part of the system according to the first embodiment to constitute the system as shown in FIG. 2. The system includes heater (for example, electrically heated wire) 30 for heating fuses 5A, 5B to a fusion temperature. The system includes logical circuit 35 for energizing heater 30. The heater 30 heats one fuse 5B (or 5A) to a fusion temperature, when the other fuse 5A (or 5B) is fused. Heater 30 primarily corresponds to a forced-fusion means.

The circuit (a part of two comparators 21A, 21B and OR circuit 22) for the detection of fusion on one fuse 5A (or 5B) is identical to the one of the first embodiment. The difference is that when an output signal of comparator 21 turns into High, OR circuit 22 drives transistor 33. The direct application of a power supply voltage of 42 V to heater 30 produces heat.

The operation of the system is described.

In the system, comparator 21B detects the voltage between both terminals of fuse 5B. For example, an abnormality in the system of actuator 4 causes fuse 5B to be fused. The potential difference between the terminals of fuse 5B allows comparator 21B to output a High signal. Transistor 33 allows a voltage of 42 V to be applied to heater 30. The heat produced by heater 30 forces the other fuse 5A to be fused. The fusion stops the energization of actuator 4.

On the other hand, comparator 21A detects the voltage between both terminals of fuse 5A. For example, an abnormality in the system of actuator 4 causes fuse 5A to be fused. The potential difference between the terminals of fuse 5B allows comparator 21A to output a High signal. OR circuit 22 outputs a drive signal to transistor 33. Transistor 33 allows a voltage of 42 V to be applied to heater 30. The heat produced by heater 30 forces the other fuse 5B to be fused. The fusion stops the energization of ECU 3.

The embodiment obtains the identical benefit to the first embodiment.

Third Embodiment

The first and second embodiments each recite the system with the safety device, in which an electric work allows for the forced-fusion of the remaining fuse. The third embodiment recites the system with the safety device, in which a mechanical work fuses the remaining fuse.

The arrangement of fuse box 50 on the system of FIG. 8 constitutes a safety device.

Figure 3:
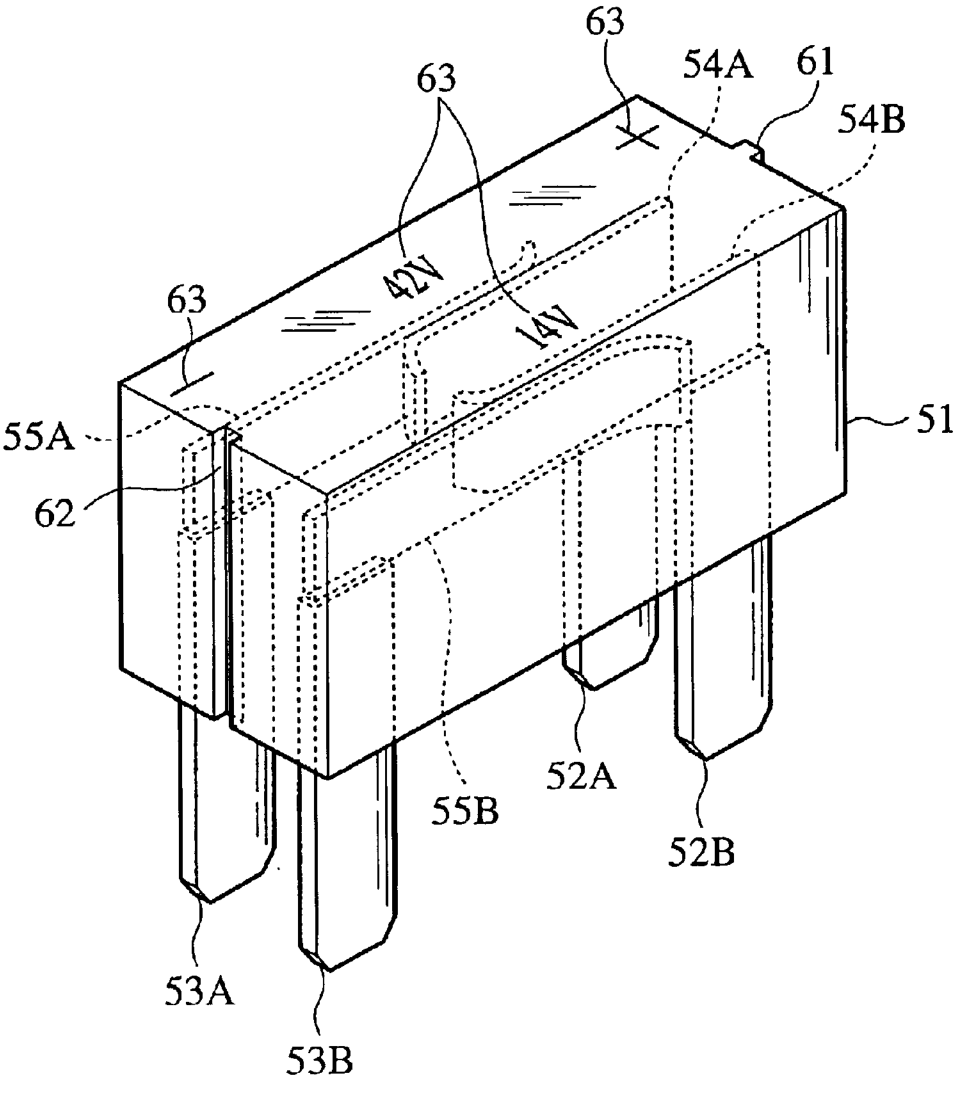
FIG. 3 is a perspective external view of the fuse box, which is adapted for the system of FIG. 8.
Figure 4:
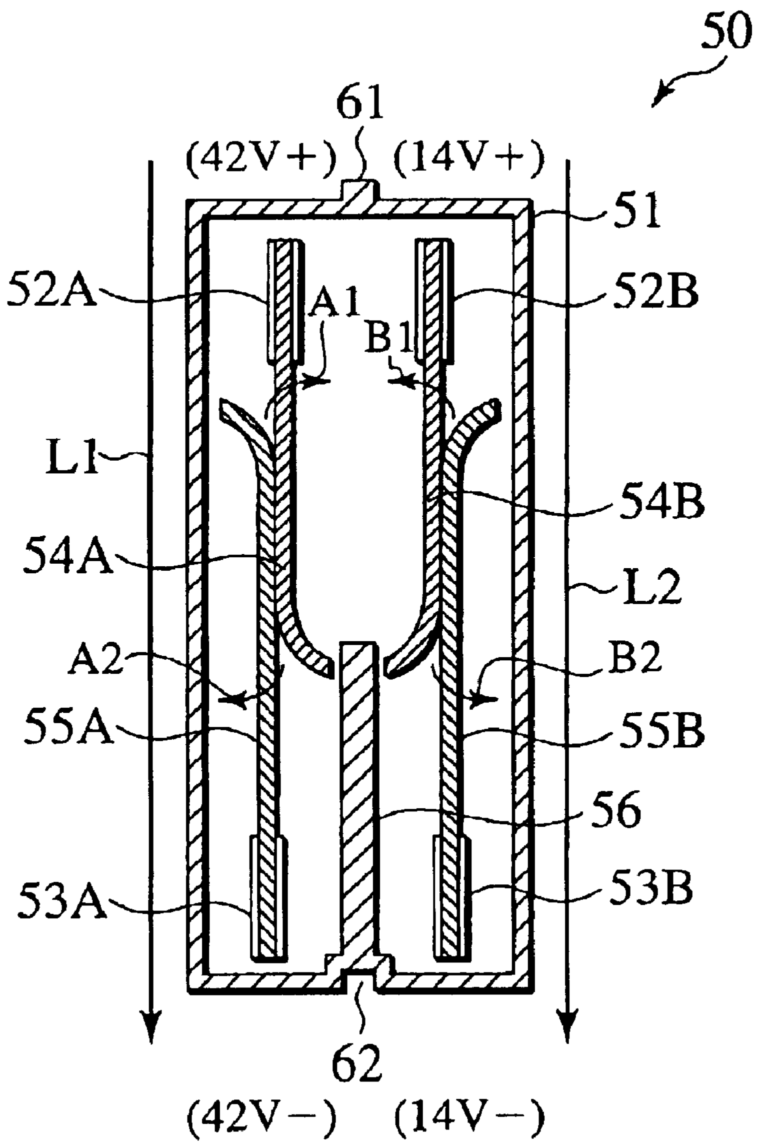
FIG. 4 is a sectional view of the fuse box in FIG. 3.

In FIGS. 3 and 4, fuse box 50 includes a casing 51 for safety protection, which is common to high (42 V) and low (14 V) voltage power circuits 2A and 2B. Box 50 includes 42 V power supply terminal (second power terminal) 52A, and 42 V load terminal (second load terminal) 53A, in casing 51. Terminal 52A is connected to the power supply 9 of high-voltage power circuit (second power circuit) 2A. Terminal 53A is connected to the load 4 of circuit 2A. Box 50 includes 14 V power supply terminal (first power terminal) 52B in casing 51 and 14 V load terminal (first load terminal) 53B. Terminal 52B connects to power supply 8 of circuit 2B. Terminal 53B connects to load 3 of circuit 2B. Box 50 includes 42 V fusible conductive member (second fusible conductive member) 54A and 12 V fusible conductive member (first fusible conductive member) 54B, which extend from terminals 52A, 52B toward terminals 53A, 53B, respectively. Box 50 includes 42 V non-fusible conductive member (second non-fusible conductive member) 55A and 14V non-fusible conductive member (first non-fusible conductive member) 55B, which extend from terminals 53A, 53B toward terminals 52A, 52B, respectively. Conductive members 55A, 55B are retained at a normal position, contacting and conducting with the ends of conductive members 54A, 54B, respectively. Conductive members 55A, 55B disengage from retention at the normal position due to the fusion of conductive members 54A, 54B in conductive contact with them.

Conductive members 54A, 54B, 55A, 55B include leaf springs with resilient ends, respectively. Inside conductive member 54A has a resilient force, which tends to deform outwardly as is shown by the arrow A2. Outside conductive member 55A has a resilient force, which tends to deform inwardly as shown by the arrow A1. The balance between the resilient forces allows conductive members 54A, 55A to be retained at a normal position as is shown in FIG. 4, before the fusion of conductive member 54A.

Inside conductive member 54B has a resilient force, which tends to deform it outwardly as shown by the arrow B2. Outside conductive member 55B has a resilient force, which tends to deform it inwardly as shown by the arrow B1. The balance between the resilient forces allows conductive members 54B, 55B to be retained at a normal position as shown in FIG. 4, before the fusion of conductive member 54B.

The contact and electrical conduction between conductive members 54A or 54B and conductive member 55A or 55B constitute a 42 V or 14V line. Conductive members 54A and 54B correspond to high and low-voltage fuses 5A and 5B of FIG. 8, respectively.

Conductive member 54A or 54B and conductive member 55A or 55B have ends, which are curled opposite to each other. The curl 55A or 55B, in FIGS. 5A, 5B, 6A and 6B, serve to retain stable contact with conductive member 54B or 54A due to the fusion of conductive members 54A or 54B. The contact portion between conductive members 54A and 55A or 54B and 55B join to improve reliable solderless electrical conduction.

Casing 51 includes rib 56 in it, which prevents careless contact between members of 42V and 14V at a normal position. Box 50 requires strict distinction between positive pole (connected to the power supply) and negative poles (connected to the load), and between voltages of 42 V and 14 V. The outer side of casing 51 has projection 61 and recess 62, which prevent error in the mounting direction. In FIG. 4, casing 51 includes the top face provided with indications 63, which represent poles (positive, negative) and voltage (42V, 14V).

Next, the operation is described.

Normally, in FIG. 4, a current of 42 V flows in turn through terminal 52A, conductive member 54A, 55A, and terminal 53A, which constitute a 42 V line. A current of 14 V flows in turn through terminal 52B, conductive member, 54B, 55B, and terminal 53B, which constitute a 14V line. The arrows L1, L2, L3 and L4 indicate the flow of current.

When an abnormality occurs in the load system of 14 V line, the operation proceeds, as shown in FIGS. 5A and 5B. When an abnormality occurs in the load system of 42 V line, the operation proceeds, as shown in FIGS. 6A and 6B.

Production of some abnormality on a load connected to 14 V line causes overcurrent more than normal to flow through the line. Heat, produced by conductive members 54B, 55B, fuses conductive member 54B at fusion portion P1 in FIG. 5A.

The contact of conductive member 55B with conductive member 54B retains conductive member 55B at a normal position. The fusion of conductive member 54B loses the mate to conductive member 55B under balanced force. Conductive member 55B displaces in a direction B1 (refer to FIG. 4) due to its own resilient force, as shown in FIG. 5B, thus contacting a portion connected to the load in an energization portion of 42V. The contact portion may be the end of conductive member 54A, or, in principle, any portion of conductive member 55A or terminal 53A. In FIG. 5A, contact with the end of conductive member 54A is established. The contact allows current to flow from the power supply of the 42 V line to the load of 14 V line under abnormality again. Overcurrent more than normal one flows through the 42 V line. The overcurrent fuses the conductive member 54A. The fusion stops the energization of both loads, thus ensuring safety.

While, if some abnormality occurs on a load connected to 14 V line, overcurrent more than normal flows through the 14 V line. Heat is produced by conductive members 54A, 55A to fuse conductive member 54A at fused portion P3, as shown in FIG. 6A.

The contact of conductive member 55A with conductive member 54A allows conductive member 55A to be retained at a normal position. The fusion of conductive member 54A loses the mate to conductive member 55A under balanced force. Conductive member 55A displaces due to its own resilient force in a direction A1 (refer to FIG. 4), as shown in FIG. 6B. Conductive member 55A contacts with an energization portion of 14V (fusible conductive member 54B in the embodiment). The contact allows current to flow from the power supply of the 14 V line to the load of 42 V line again. Overcurrent more than normal flows through the 42 V line. The overcurrent fuses the conductive member 54B. The fusion stops the energization of both loads, thus ensuring safety.

In box 50, conductive members 54A, 55B of leaf spring correspond to forced-fusion means, which forces the remaining conductive members (corresponding to a fuse) 54A, 54B to be fused. If either of conductive member 54B or 54A of 14 V or 42 V line is fused first, members, connected to the power supply on the 14 V or 42 V lines have no contact with each other in the step of fusing the remaining one.

Box 50 includes conductive members 55A, 55 of a leaf spring. When one conductive member 54A or 54B fuses, it contacts with the remaining conductive member 54B or 54A. The structure of conductive members 55A, 55B themselves of leaf spring decreases the number of components, thus simplifying the structure. Identically to this, another spring 59A, 59B may be provided to bias against conductive member 55A or 55B in a direction A1 or B1 as shown in FIG. 7.

The embodiment serves a high voltage as 42 V and a low voltage as 12 V or 14 V. A value of voltage is arbitrarily established.

The entire contents of Japanese Patent Applications P2001-289523 (filed on Sep. 21, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A safety device for a power circuit, comprising:

a first power circuit including a first load and a first fuse element for receiving a first voltage power from a power supply to supply the first voltage power to the first load through the first fuse element;

a second power circuit including a second load and a second fuse element for receiving a second voltage power from a converter, which converts the first voltage power into the second voltage power, to supply the second voltage power to the second load through the second fuse element; and a fusion system for fusing the other of the first and second fuse elements when an arbitrary one of the first and second fuse elements fuses.

2. The safety device of claim 1, wherein the fusion system comprises a circuit for applying overcurrent to the other fuse element to be fused when said arbitrary fuse element fuses.

3. The safety device of claim 1, wherein the fusion system comprising a heating element for heating the other fuse element to be fused at a fusion temperature when said arbitrary fuse element fuses.

4. The safety device of claim 1, wherein the first power circuit comprises a first power terminal connected to the power supply; and a second load terminal connected to the first load, wherein the second power circuit comprises a second power terminal connected to the power supply; and a second load terminal connected to the second load, wherein the first fuse element includes a first fusible member extending from the first power terminal, wherein the second fuse element includes a second fusible member extending from the second power terminal, wherein the fusion system comprises a first conductive member extending from the first load terminal, and conductively contacting with the first fusible member; and a second conductive member extending from the second load terminal, and conductively contacting with the second fusible member, a displacing mechanism for displacing a corresponding conductive member to contact with the other fusible member, the other conductive member or the other load terminal, when said arbitrary fusible member fuses.

5. The safety device of claim 1, wherein the second load includes a controller for controlling the first load.

6. The safety device of claim 5, wherein the second power circuit supplies a current to the controller, serving as a power circuit for low-voltage, wherein the first power circuit supplies a current to the first load, serving as a power circuit for high-voltage.

7. The safety device of claim 1, wherein the first fuse element comprises a first fusible member arranged side by side with a first circuit member of the first power circuit, wherein the second fuse element comprises a second fusible member arranged side by side with a second circuit member of the second power circuit, wherein the fusion system comprises a first conductive member having a tendency to deform to contact with the second circuit member, the first conductive member being separated from the second circuit member and being retained against the first fusible member; and a second conductive member having a tendency to deform to contact with the first circuit member, the second conductive member being separated away from the first circuit member and being retained against the second fusible member.

8. The safety device of claim 1, wherein the fusion system comprises a first shunt circuit between the first fuse element and the first load for grounding the first power circuit; and a control circuit responsive to identical electric potentials of both terminals of the second fuse element to open the first shunt circuit.

9. The safety device of claim 8, wherein the control circuit is responsive to an electric potential difference between both terminals of the second fuse element to close the first shunt circuit.

10. The safety device of claim 1, wherein the fusion system comprises a second shunt circuit between the second fuse element and the second load for grounding the second power circuit; and a control circuit responsive to identical electric potentials of both terminals of the first fuse element to open the second shunt circuit.

11. The safety device of claim 10, wherein the control circuit is responsive to an electric potential difference between both terminals of the second fuse element to close the first shunt circuit.

12. A fuse box adapted for power circuits, comprising:

a first power terminal configured to connect a power supply via a first power circuit;

a first load terminal configured to connect a load of the first power circuit;

a second power terminal configured to connect the power supply via a second power circuit;

a second load terminal configured to connect a load of the second power circuit;

a first fusible member extending from the first power terminal;

a second fusible member extending from the second power terminal;

a first conductive element extending from the second load terminal, and conductively contacting with the first fusible member; and a second conductive member extending from the second load terminal, and conductively contacting with the second fusible member;

a displacing system for displacing a corresponding one of the first and second conductive members to contact with the other fusible member, the other conductive member or the other load terminal, when an arbitrary one of the first and second fusible members fuses.

13. The fuse box of claim 12, wherein said corresponding conductive member has resilience.

14. The fuse box of claim 12, wherein the displacing system comprises a resilient member biasing said corresponding conductive member against said arbitrary fusible member.

* * * * *